Figure 1:
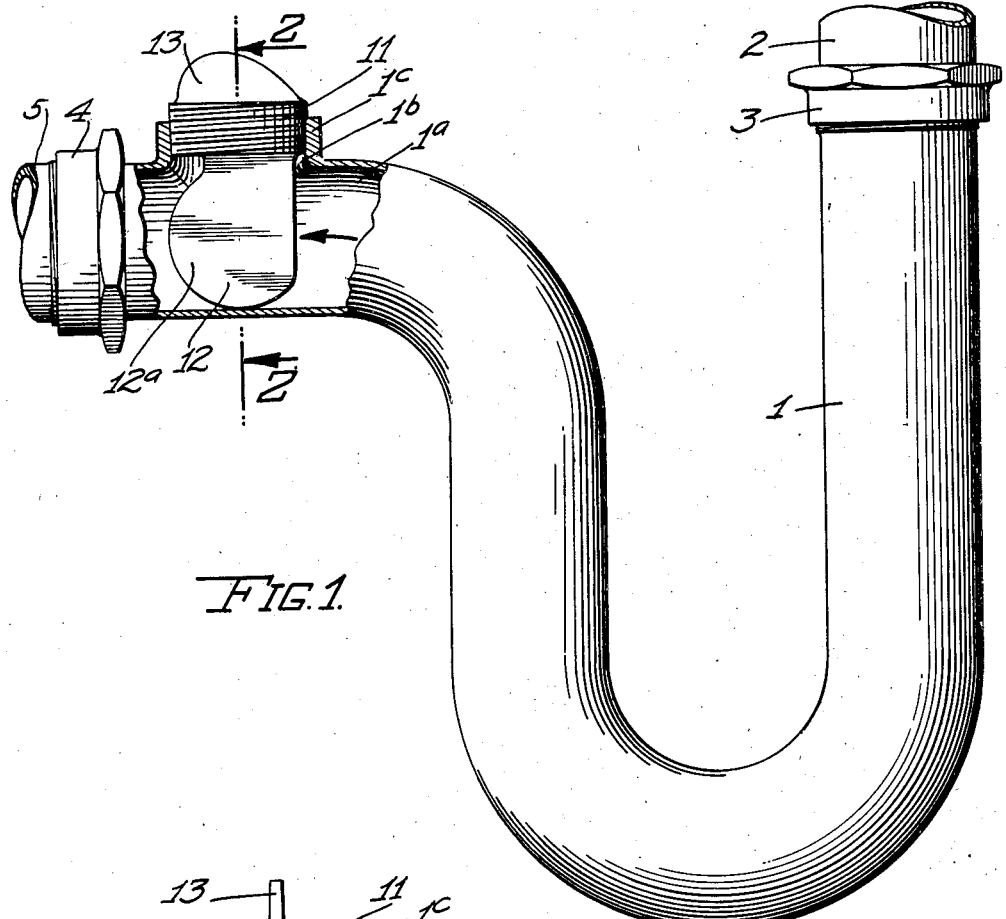

June 24, 1947.  W. J. ROHLING  2,422,801
PLUMBING TRAP HAVING MEANS FOR CLEARING THE SAME OF STOPPAGE
Filed Sept. 11, 1943

INVENTOR.
WILLIAM J. ROHLING.
BY
ATTORNEY.

Patented June 24, 1947

2,422,801

UNITED STATES PATENT OFFICE 2,422,801

PLUMBING TRAP HAVING MEANS FOR CLEARING THE SAME OF STOPPAGE

William J. Rohling, Los Angeles, Calif.

Application September 11, 1943, Serial No. 501,933

5 Claims. (Cl. 182—24)

My invention relates to a plumbing fixture and more particularly to a trap construction employed in the drains of plumbing receptacles.

When stoppage results in the drain portions of plumbing receptacles, I have found that the stoppage seldom occurs in the gooseneck portion of the trap, which is accessible from the receptacle itself, but most frequently in that portion beyond or which extends outwardly and usually horizontally from the gooseneck.

One of the principal objects of this invention is to provide a trap having a cleanout opening outwardly from the gooseneck of a trap of this class, and one which is readily accessible for cleaning out or clearing the passage of this portion of the drain.

Another important object of this invention is to provide means in connection with the passage of a pipe whereby a portion of the passage may be readily and directly cleaned or cleared out and also whereby a pressure means directed into the passage may be periodically checked or diverted to facilitate the flow in the passage of the pipe.

An important object of this invention is to provide a means, described in the foregoing object, in combination with a plug for the cleanout opening mentioned above, whereby such means, in the form of a vane, may be readily moved or rotated with the rotation of the plug.

A further object of this invention is the provision of a flange or similar extension on the plug for rotating or screwing the same, even by hand, and which is aligned with the above mentioned vane so that the direction of the latter with respect to the pipe passage may be readily determined.

Figure 2:
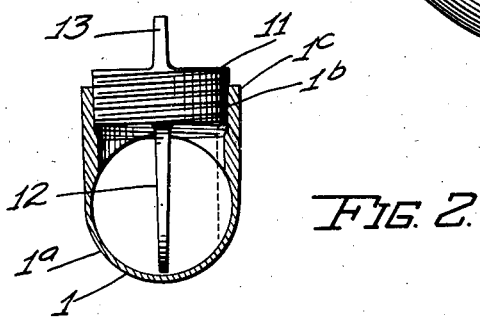

With these and other objects in view, as will appear hereinafter, I have devised a plumbing fixture, or similar device, having certain novel features of construction, combination, and arrangement of parts and portions, as will be hereinafter described, and particularly set forth in the appended claims, reference being had to the drawing, and to the characters of reference thereon, which form a part of this application, in which:

Fig. 1 is a fragmentary side elevation of a plumbing trap embodying my invention in one form; and Fig. 2 is a transverse sectional view thereof taken through 2—2 of Fig. 1.

The trap 1, shown in the drawing, is of substantially the type and gooseneck shape used in conventional plumbing construction. This trap is shown connected by a coupling 2 to the discharge pipe 3, usually provided on plumbing receptacles.

Many of the traps now in use are also provided with horizontal portions which extend laterally from the gooseneck, as indicated by $1^a$ in the drawing. This horizontal portion is usually connected, by a coupling 4, to the drain pipe 5 leading to the sewer main.

I have provided a trap having a horizontal portion $1^a$ which is long enough that a cleanout opening $1^b$ may be provided at the upper portion thereof, for cleaning out the drain pipe to either side of the opening. This opening is formed in a boss $1^c$ which may be of the diameter or smaller than the diameter of the portion $1^a$. The boss $1^c$ is also internally threaded for receiving a screw plug 11.

This plug has at its inner end a vane 12, for agitating or controlling the substance in the passage of the horizontal pipe portion $1^a$, and at its outer end a flange 13, for rotating or screwing the plug in or out. Both vane and flange are aligned or positioned coplanar, so that the position of the vane in the passage of the pipe may be determined from the position of the flange without.

One lateral end of the vane is longer than the other, forming a fin $12^a$; that is, the distance of the fin from the axis of the plug is greater than the distance of the other end of the vane from the axis, and the former distance is also preferably greater than the radius of the plug. By oscillating the vane about its axis the flow of the fluid pressure means forced into the drain of the plumbing receptacle may either be retarded periodically or diverted, as desired, to facilitate the cleaning or clearing of the pipe or to facilitate the flow therein.

The flange or similar device 13 is large enough that the plug may be oscillated by hand. One end of the flange is made larger to correspond with the enlarged portion of the vane, so that the position of the vane may be still more easily determined.

Though I have shown and described a particular construction, combination, and arrangement of parts and portions of my plumbing fixture, I do not wish to be limited to the same, but desire to include in the scope of my invention the construction, combination, and arrangement substantially as set forth in the appended claims.

I claim:

1. In a means of the class described, a trap having a gooseneck with an inlet at one end and a horizontal discharge portion at the opposite end, the horizontal portion having a cleanout opening, and a plug comprising a plug portion for the opening and a transverse vane extending from the plug portion into the passage of the horizontal portion of the trap and adapted to be rotated transversely in the passage with the rotation of the plug in the opening.

2. In a means of the class described, a trap having a gooseneck with an inlet at one end and a horizontal discharge portion at the opposite end, the horizontal portion having a cleanout opening, and a plug comprising a threaded plug portion for the opening and a transverse vane extending from the plug portion into the passage of the horizontal portion of the trap and adapted to be rotated transversely in the passage with the rotation of the plug in the opening.

3. In a means of the class described, a trap having a gooseneck with an inlet at one end and a horizontal discharge portion at the opposite end, the horizontal portion having a cleanout opening, and a plug comprising a plug portion for the opening and a transverse vane extending from the plug portion into the passage of the horizontal portion of the trap and adapted to be rotated transversely in the passage with the rotation of the plug in the opening, the lateral dimension of the vane being less than the diameter of the opening but the distance from the axis of the plug to the greatest lateral extent of the vane being greater than the radius of the opening.

4. In a means of the class described, a trap having a gooseneck with an inlet at one end and a horizontal discharge portion at the opposite end, the horizontal portion having a cleanout opening, and a plug comprising a plug portion for the opening and a transverse vane extending from the plug portion into the passage of the horizontal portion of the trap and adapted to be rotated transversely in the passage with the rotation of the plug in the opening, the outer end of the plug having a transverse flange aligned with the vane.

5. In a means of the class described, a trap having a gooseneck with an inlet at one end and a horizontal discharge portion at the opposite end, the horizontal portion having a cleanout opening, and a plug comprising a plug portion for the opening and a transverse vane extending from the plug portion into the passage of the horizontal portion of the trap and adapted to be rotated transversely in the passage with the rotation of the plug in the opening, the lateral dimension of the vane being less than the diameter of the opening but the distance from the axis of the plug to the greatest lateral extent of the vane being greater than the radius of the opening, the outer end of the plug having a transverse flange aligned with the vane, the flange being higher at the end corresponding with the greatest lateral extent of the vane.

WILLIAM J. ROHLING.

REFERENCES CITED

The following references are of record in the file of this patent:

UNITED STATES PATENTS

| Number | Name | Date |
|---|---|---|
| 387,252 | Paradice | Aug. 7, 1888 |
| 528,459 | Beliveau | Oct. 30, 1894 |
| 559,188 | Moore | Apr. 28, 1896 |
| 597,497 | Gunderman | Jan. 18, 1898 |
| 1,114,881 | Hayes | Oct. 27, 1914 |
| 1,132,954 | Mann | Mar. 23, 1915 |
| 267,306 | Gall | Nov. 7, 1882 |
| 875,832 | Mann | Jan. 7, 1908 |
| 1,098,128 | Schlacht | May 26, 1914 |
| 1,759,803 | Pysher et al. | May 20, 1930 |
| 232,376 | Staples | Sept. 21, 1880 |

FOREIGN PATENTS

| Number | Country | Date |
|---|---|---|
| 301,998 | Germany | Nov. 26, 1917 |